(12) United States Patent
Moore et al.

(10) Patent No.: US 8,475,925 B2
(45) Date of Patent: Jul. 2, 2013

(54) PBI/EPOXY COATINGS

(75) Inventors: John C. Moore, Camarillo, CA (US);
Gregory S. Copeland, Tega Cay, SC (US); Michael Gruender, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 16 days.

(21) Appl. No.: 13/163,836

(22) Filed: Jun. 20, 2011

(65) Prior Publication Data

US 2012/0156500 A1 Jun. 21, 2012

Related U.S. Application Data

(60) Provisional application No. 61/357,116, filed on Jun. 22, 2010.

(51) Int. Cl.
*B32B 27/38* (2006.01)
*B32B 27/28* (2006.01)
*B32B 27/06* (2006.01)
*C08G 59/18* (2006.01)
*C09D 163/00* (2006.01)
*C09D 179/00* (2006.01)

(52) U.S. Cl.
USPC ............ 428/414; 428/413; 525/423; 525/533

(58) Field of Classification Search
None
See application file for complete search history.

(56) References Cited

U.S. PATENT DOCUMENTS

| | | | |
|---|---|---|---|
| 3,836,500 A * | 9/1974 | Calundann et al. | 524/234 |
| 3,855,171 A | 12/1974 | Wegehaupt et al. | |
| 4,353,954 A * | 10/1982 | Yamaoka et al. | 428/216 |
| 5,549,946 A | 8/1996 | Iura et al. | |
| 5,674,614 A | 10/1997 | Onishi et al. | |
| 5,721,323 A * | 2/1998 | Schultz et al. | 525/504 |
| 2002/0007959 A1 | 1/2002 | Kaltenborn et al. | |
| 2004/0028824 A1* | 2/2004 | Aizawa | 427/385.5 |
| 2004/0242740 A1 | 12/2004 | Ryang | |
| 2005/0143534 A1* | 6/2005 | Dueber et al. | 525/476 |
| 2007/0083017 A1 | 4/2007 | Dueber et al. | |
| 2007/0230846 A1* | 10/2007 | Tanaka et al. | 384/276 |
| 2008/0054416 A1 | 3/2008 | Goodner et al. | |
| 2008/0185561 A1 | 8/2008 | Summers | |
| 2010/0028547 A1* | 2/2010 | Shiga et al. | 427/385.5 |
| 2010/0137485 A1 | 6/2010 | Scholz et al. | |
| 2011/0129601 A1 | 6/2011 | Moore et al. | |

FOREIGN PATENT DOCUMENTS

JP 51053599 A * 5/1976

OTHER PUBLICATIONS

Translation of JP 51053599 A, provided by the USPTO translations unit (no date).*

* cited by examiner

*Primary Examiner* — Michael J Feely
(74) *Attorney, Agent, or Firm* — Hammer & Associates, P.C.

(57) ABSTRACT

A coating is a mixture of polybenzimidazole polymer and an epoxy. The coating may further include a primer underlying the coating. The coating may further include an adhesion promoter. A solution includes a polybenzimidazole polymer, an epoxy resin, an initiator, and a carrier solvent. The solution may further include a stabilizer and/or an adhesion promoter.

33 Claims, No Drawings

PBI/EPOXY COATINGS

RELATED APPLICATION

This application claims the benefit of U.S. Provisional Application Ser. No. 61/357,116 filed Jun. 22, 2010.

FIELD OF THE INVENTION

This invention is directed to a coating comprising a polyazole and epoxy, and a solution comprising a polyazole, an epoxy resin, an initiator, and a solvent.

BACKGROUND OF THE INVENTION

Coatings, that include a polybenzimidazole as a component, are been mentioned in the art. For example, U.S. Pat. No. 5,549,946 teaches the surface of a heat-resistant roll for a copying machine is coated with a varnish containing polybenzimidazole as a major resin component. U.S. Pat. No. 5,674,614 teaches an electrical wire is coated with a polybenzimidazole varnish. U.S. patent application Ser. No. 12/957,601 filed Dec. 1, 2010 teaches a mixture of polybenzimidazole and polyacrylate.

Coatings are generally used to protect the underlying materials (i.e., substrates). Coatings, of particular interest to the instant application, would be those used in high temperature environments and where chemical resistance is an advantage. Such environments include, but are not limited to, internal combustion engines, manufacture of semiconductor devices, manufacture of chemicals and refinement of oil, and the like.

Accordingly, there is a need for new coatings that have good stability and resistance to high temperature, chemical, and corrosive environments and adhere well to their substrates.

SUMMARY OF THE INVENTION

A coating is a mixture of polybenzimidazole polymer and an epoxy. The coating may further include a primer underlying the coating. The coating may further include an adhesion promoter. A solution includes a polybenzimidazole polymer, an epoxy resin, an initiator, and a carrier solvent. The solution may further include a stabilizer and/or an adhesion promoter.

DESCRIPTION OF THE INVENTION

A coating is a layer of material spread over the surface of a substrate. The coating protects the substrate from harsh environments that may include high temperatures, harsh chemicals, and corrosive materials, or a combination thereof.

The substrates may include any material. The substrates specifically include metal and ceramic substrates. Metal substrates include, but are not limited to, steel, stainless steel, copper, aluminum, and titanium. Ceramic substrates include, but are not limited to, glass, quartz, and silicon. Metal substrates may be cleansed prior to priming and/or coating with a 5 weight % TSP (tri sodium phosphate) in de-ionized (DI) water at 70-80 C for 15 minutes, then rinsed (3×) with DI water, and then dried with either a paper towel or air.

The coatings include a polybenzimidazole (PBI) and an epoxy. The weight ratio of epoxy:PBI may range from 1-199: 199-1. In one embodiment, the weight ratio of epoxy:PBI may range from 1:1-15. In another embodiment, the weight ratio may range from 2-10:3-15. In yet another embodiment, the weight ratio may be in the range of 1-3:2-6.

The coating is free of: any fibers (including, but not limited to, fibers, staple, filaments, or fibrils); any flame retardants (including, but not limited to, any chemicals based upon silicon or phosphorus chemistries); any fillers (including, but not limited to, silicas, nanoparticles, nanofibers); any lubricants.

The coating may further include a primer. The primer is located between the coating and the substrate and is used to facilitate adhesion of the coating to the substrate. While a primer can be used to promote adhesion of the coating to the substrate, it is not always needed. However, when the coating is intended for use on a metal substrate, the primer has been used to increase the adhesion of the coating. The primer may include: the polybenzimidazole polymer, the epoxy resin, or a combination of both. In one embodiment, the primer includes the epoxy resin. In another embodiment, the primer's epoxy resin is matched with (i.e., the same as) the epoxy of the coating. The primer may be applied as mixture of the polymer and/or epoxy resin in a carrier solvent. The carrier solvent may be: N,N-dimethylacetamide (DMAC); N,N-dimethylacrylamide (DMAA), N,N-dimethylformamide (DMF), dimethylsulfoxide (DMSO), and N-methyl-2-pyrolidone (NMP). In one embodiment, the solvent may be N,N-dimethylacrylamide (DMAA). In another embodiment, the solvent may be N,N-dimethylacetimide (DMAC). The primer solution may include a total dissolved solids in the range of 2-10% by weight. In one embodiment, the total dissolved solids of the solution was in the range of 2-5% by weight.

The coating may further include an adhesion promoter. The adhesion promoter is a material that facilitates the adhesion of the coating to the substrate and/or the primer. In one embodiment, the weight ratio of the epoxy:PBI:adhesion promoter may be in the range of 1:1-15:0.01-1.5. In another embodiment, the ratio is 2-10:3-15:0.03-1.5. In one embodiment, the adhesion promoter may be boric oxide.

Polybenzimidazole (PBI) as used herein refers to PBI, blends of PBI with other polymers, co-polymers of PBI, and combinations thereof. In one embodiment, the PBI component is the major (i.e., at least 50 wt %) component. Polybenzimidazole (PBI) refers to, for example, the product of the melt polymerization of an tetraamine (e.g., aromatic and heteroaromatic tetra-amino compounds) and a second monomer being selected from the group consisting of free dicarboxylic acids, alkyl and/or aromatic esters of dicarboxylic acids, alkyl and/or aromatic esters of aromatic or heterocyclic dicarboxylic acid, and/or alkyl and/or aromatic anhydrides of aromatic or heterocyclic dicarboxylic acid. Further details may be obtained from U.S. Pat. Nos. Re. 26,065; 4,506,068; 4,814, 530; and US Publication No. 2007/0151926, each of which is incorporated herein by reference. PBI is commercially available from PBI Performance Products, Inc. of Charlotte, N.C.

The aromatic and heteroaromatic tetra-amino compounds, used in accordance with the invention, are preferably 3,3',4, 4'-tetra-aminobiphenyl, 2,3,5,6-tetra-aminopyridine, 1,2,4, 5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3', 4,4'-tetra-aminodiphenyldimethylmethane, and their salts, in particular, their mono-, di-, tri-, and tetrahydrochloride derivatives.

The aromatic carboxylic acids used, in accordance with the invention, are dicarboxylic acids or its esters, or its anhydrides or its acid chlorides. The term "aromatic carboxylic acids" equally comprises heteroaromatic carboxylic acids as well. Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-napthalenedicarboxylic acid, diphenic acid, 1,8-dihydroxynaphthalene-3,6-dicarboyxlic acid, diphenyl ether-4,4'-dicarboxylic acid, benzophenone-4,4'-dicarboxylic acid, diphenylsulfone-4,4'-dicarboyxlic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C12-aryl esters, or their acid anhydrides or their acid chlorides.

The heteroaromatic carboxylic acids used, in accordance with the invention, are heteroaromatic dicarboxylic acids or their esters or their anhydrides. The "heteroaromatic dicarboxylic acids" include aromatic systems that contain at least one nitrogen, oxygen, sulfur, or phosphorus atom in the ring. Preferably, it is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine dicarboxylic acid, 2,5-pyrazine dicarboxylic acid, 2,4,6-pyridine tricarboxylic acid, and benzimidazole-5,6-dicarboxylic acid, as well as their C1-C20-alkyl esters or C5-C12-aryl esters, or their acid anhydrides or their acid chlorides.

The aromatic and heteroaromatic diaminocarboxylic acid used in accordance with the invention is preferably diaminobenzoic acid and its mono- and dihydrochloride derivatives.

Preferably, mixtures of at least 2 different aromatic carboxylic acids are used. These mixtures are, in particular, mixtures of N-heteroaromatic dicarboxylic acids and aromatic dicarboxylic acids or their esters. Non-limiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynapthalene-3,6-dicarboxylic acid, diphenyl ether-4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidine dicarboxylic acid, and 2,5-pyrazine dicarboxylic acid. Preferably, it is the diphenyl isophthalate (DPIP) and its ester.

Examples of polybenzimidazoles which may be prepared according to the process as described above include: poly-2,2'-(m-phenylene)-5,5'-bibenzimidazole; poly-2,2'-(biphenylene-2"2'")-5,5'-bibenzimidazole; poly-2,2'-(biphenylene-4"4'")-5,5'-bibenzimidazole; poly-2,2'-(1",1'",3"'trimethylindanylene)-3"5"-p-phenylene-5,5'-bibenzimidazole; 2,2'-(m-phenylene)-5,5'-bibenzimidazole/2,2-(1",1'",3"-trimethylindanylene)-5",3"-(p-phenylene)-5,5'-bibenzimidazole copolymer; 2,2'-(m-phenylene)-5,5-bibenzimidazole-2,2'-biphenylene-2",2'"-5,5'-bibenzimidazole copolymer; poly-2,2'-(furylene-2",5")-5,5'-bibenzimidazole; poly-2,2'-(naphthalene-1",6")-5,5'-bibenzimidazole; poly-2,2'-(naphthalene-2",6")-5,5'-bibenzimidazole; poly-2,2'-amylene-5,5'-bibenzimidazole; poly-2,2'-octamethylene-5,5'-bibenzimidazole; poly-2,2'-(m-phenylene)-diimidazobenzene; poly-2,2'-cyclohexenyl-5,5'-bibenzimidazole; poly-2,2'-(m-phenylene)-5,5'-di(benzimidazole)ether; poly-2,2'-(m-phenylene)-5,5'-di(benzimidazole)sulfide; poly-2,2'-(m-phenylene)-5,5'-di(benzimidazole)sulfone; poly-2,2'-(m-phenylene)-5,5'-di(benzimidazole)methane; poly-2,2"-(m-phenylene)-5,5"-di(benzimidazole)propane-2,2; and poly-ethylene-1,2-2,2"-(m-phenylene)-5,5"-dibenzimidazole)ethylene-1,2 where the double bonds of the ethylene groups are intact in the final polymer. Poly-2,2'-(m-phenylene)-5,5'-bibenzimidazole, a preferred polymer, can be prepared by the reaction of 3,3',4,4'-tetraaminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

The PBI polymer may have an IV (inherent viscosity) in the range of 0.10-2.00 dL/g. IV (inherent viscosity), as used herein, is the ratio of the specific viscosity of a solution of known concentration to the concentration of the solute extrapolated to zero concentration, measured in units of dL/g (deciliters/gram). It is directly proportional to the polymer-average molecular weight, and is based on the concentration of the polymer sample tested, g/100 ml or g/deciliter. The polymer is dissolved at the 0.4% (w/v) level in 100 ml of 96.5% (+/−0.5%) sulfuric acid at 80° C. After filtering, an aliquot is measured for IV using a calibrated Cannon-Fenske capillary viscometer in a 25° C. (+/−0.1° C.) water bath, the flow time (sec.) of the PBI polymer solution measured vs. the dissolving solvent: IV=ln($t_1/t_2$)/c, where the natural log of the flow time of the PBI solution ($t_1$) over the flow time of the solvent ($t_2$) is divided by the PBI solution concentration (c). In one embodiment, the IV may be $\geq 0.4$ dL/g.

The epoxy is the reaction product of an epoxy resin (i.e., compound including an epoxide group and a polymer) and an initiator. The epoxy may be cured with heat. Epoxy resins contain, on average, multiple epoxide functional groups, also called oxirane, or ethoxyline groups, and normally identified as a three-membered oxide ring. Epoxy resins used for this invention comprise the following structures classified as (1) glycidyl ethers, (2) glycidyl esters, (3) gylcidyl amines, (4) linear aliphatics, and (5) cycloaliphatics:

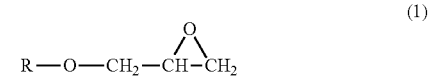

(1)

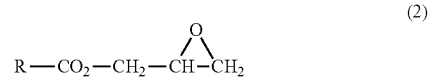

(2)

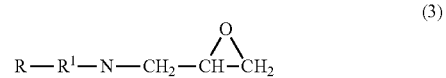

(3)

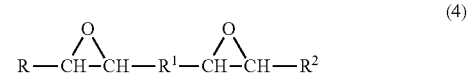

(4)

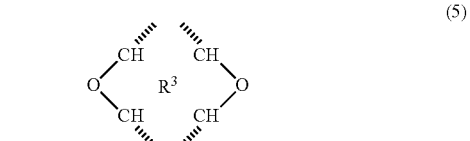

(5)

where both R, $R^1$, and $R^2$ may represent the following: hydrogen (—H), amide (—$NH_2$), methyl (—$CH_3$), hydroxyl (—OH), alcohol (—$CH_2OH$), or any one of the groups represented by the formula —$C_nH_{(2n)}$, —$C_nH_{(2n+1)}$, or —$C_nH_{(2n)}OH$ where n varies from 2-20; cyclic and aromatic hydrocarbon functional groups of the formula —$C_6X_5$, where X may be substituent groups such as hydrogen (—H), the halogens (—F, —Br, —Cl, —I), hydroxyl (—OH), and —COOH groups, $R^3$ represents a cyclic or aromatic structure of the formula —$C_6X_5$, where X may be substituent groups such as hydrogen (—H), the halogens (—F, —Br, —Cl, —I), hydroxyl (—OH), and —COOH groups, all of these variations may exist in multiple substituent formats, or monomers, as given in the example structure (6):

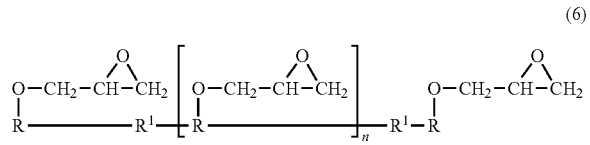
(6)

wherein structure (6) describes a polymer comprising monomers of glycidyl ether with substituent R and linked by $R^1$. Such resins may include: CARDOLITE 514 (difunctional glycidyl ether epoxy resin) produced by Cardolite Corporation, ADEKA EP 4088S (epoxy resin and urethane resin curing agent) produced by Adeka Corporation, EBECRYL3605 (partially acrylated bisphenol-A epoxy) produced by Cytec Industries, Inc.

In one embodiment, epoxy resin includes those of the structure (6), wherein the monomeric epoxide substituent is of the novolac variety, also referred to as epoxidized novolac resins, where R represents an aromatic ring of the form $C_6X_5$, where X may be substituent groups such as hydrogen (—H), the halogens (—F, —Br, —Cl, —I), hydroxyl (—OH), and —COOH groups, and the linkage $R^1$ is best represented by substituents of the formula —$C_nH_{(2n)}$. Such epoxy novolac resins includes those in practice where there exists 3-6 epoxide groups per molecule (n=1.6) of the general formula exhibited by the structure (6). General commercialized products which meet this general criteria include: DEN 431 and DEN 439 produced by The DOW Chemical Company; EPON 154, EPON 160 and EPON 161 produced by Resolution Performance Products (Hexion), REZICURE 3056 produced by SI Group.

An initiator (also referred to as a cross-linking agent or a curing agent) is used to polymerize the epoxy resin. The reaction initiates the epoxide ring to open and once reacted, undergoes cross-linking with other species to form a hardened, three-dimensional network. The initiator may include an amine and/or an acid anhydride. In one embodiment, the initiator may be alkaline additives of the polyamine form and of higher molecular weight. Higher molecular weight amine chemistries will remain in the system for longer durations and provide an environment, which efficiently cross-links the epoxy resin. Amines may include triethylenetetramine (TETA), N-methylethanolamine (NMEA), and N-methyldeethanolamine (DMEA) produced by The DOW Chemical Company, and meta-xylenediamine (MXDA) as produced by Mitsubishi Chemical Company. Desirable amine amounts are typically present at levels similar to that of the epoxy resin. Concentrations of amine range from about 1% to about 5%, by weight of the solution.

Prior to forming the coating, there is a solution including the polybenzimidazole polymer, an epoxy resin, an initiator, and a carrier solvent. The polybenzimidazole polymer, epoxy resin, and initiator are discussed above and are incorporated herein by reference. In one embodiment, the solution has a total dissolved solids in the range of 5-30% (i.e., the combined weight of the polybenzimidazole polymer, epoxy resin, and initiator is 5-30% by weight of the solution). In another embodiment, the solution has a total dissolved solids of 5-25%. In yet another embodiment, the solution has a total dissolved solids of 5-20%. The solution may be applied to the substrate in any conventional manner, including, but not limited to, brushing, spraying, spin coating.

The carrier solvent may be any solvent that can dissolve the polybenzimidazole polymer, epoxy resin, and initiator. The carrier solvent may be: N, N-dimethylacetamide (DMAC); N,N-dimethylacrylamide (DMAA), N, N-dimethylformamide (DMF), dimethylsulfoxide (DMSO), and N-methyl-2-pyrrolidone (NMP), azo bis isobutyronitrile (AIBN), 1,3-dioxolane (dioxolane) and combinations thereof. In one embodiment, the solvent may be N,N-dimethylacrylamide (DMAA). In another embodiment, the solvent may be N,N-dimethylacetimide (DMAC).

The solution may further include a stabilizer. The stabilizer is used to prevent the formation of polymer gels and to keep the dissolved solids in solution for as long as possible. The stabilizer may be a lithium compound. The lithium compounds may include lithium chloride (LiCl) and/or lithium nitrate ($LiNO_3$). The stabilizer, in one embodiment, may comprise 0.1-5.0 weight % of the solution. In another embodiment, the stabilizer may comprise 0.5-2.0 weight % of the solution.

The solution may further include an adhesion promoter. The adhesion promoter is discussed above and incorporated herein by reference.

In the solution, the weight ratio of epoxy resin:initiator may be the range of 1-10:10-1. In another embodiment, the epoxy resin:initiator ratio may be the range of 1-3:3-1. The ratio of epoxy resin and initiator:polybenzimidazole polymer may be in the range of 1-199:199-1. In another embodiment, the ratio of epoxy resin and initiator:polybenzimidazole polymer may be in the range of 1:1-15. In yet another embodiment, the ratio of epoxy resin and initiator:polybenzimidazole polymer may be in the range of 2-10:3-15. The ratio of epoxy resin and initiator:polybenzimidazole polymer:adhesion promoter may be in the range of 1:1-15:0.01-1.5.

The foregoing invention will be further illustrated by way of the following non-limiting examples.

EXAMPLES

The following examples trace the development of the invention disclosed herein. The examples illustrate how the invention was conceived and tested, but by no means are these examples meant to be limiting upon the invention.

All % are weight percentages.

Example 1

In Example 1, several mixtures of polyazoles, epoxies, initiators, and solvents at various weight ratios are screened for: Stability (a visual observation of changes in the mixture after standing at room temperature overnight); Appearance (a visual observation of the mixture's appearance after standing at room temperature overnight); Cross-hatch adhesion (ASTM D3359 modified as follows: using either a 1"×3" or 2"×3" slide, the slide was coated with 0.5 ml of material and spread evenly, then after drying/curing 9 cross hatches (4 vertical and 5 horizontal) were cut into the material at 3 mm intervals); Pull-tape adhesion ASTM D3359 modified as follows: using either a 1"×3" or 2"×3" slide, the slide was coated with 0.5 ml of material and spread evenly, then after drying/curing 9 cross hatches (4 vertical and 5 horizontal) were cut into the material at 3 mm intervals); Thickness, micron or µm, (measured, if sample passes cross-hatch test, with a micrometer, sample measurements are averaged). The results are reported in TABLE 1. Samples were coated onto glass substrates and cured at: 150° C. for 30 minutes; then 280° C. for 30 minutes, and then 380° C. for 30 minutes.

TABLE 1

| Sample | Description | Stability | Appearance | Cross-hatch | Tape-Pull | Thickness |
|---|---|---|---|---|---|---|
| 1A | 71.25% of 15% PBI in DMAA + 23.75% of REZICURE 3056 in DMAA + 5% of 10% AIBN in Dioxolane | No Change | Slightly darker color | Pass | Partial Pass, some areas came off | 11 |
| 1B | 5% of 40% REZICURE 3056 in DMAA + 5% NMEA + 90% of 9% PBI in DMAA | No Change | Darker color | Pass | Partial Pass, some areas came off | 8 |
| 1C | 2.5% ADEKA EP 4088S + 2.5% TETA + 95% of 9% PBI in DMAA | No Change | Darker color | Pass | Pass | 12 |
| 1D | 2.5% of 50% DEN 439 in DMAA + 2.5% TETA + 95% of 9% PBI in DMAA | No Change | Darker color | Pass | Partial Pass, very little came off | 11 |
| 1E | 2.5% CARDOLITE 514 + 2.5% TETA + 95% of 9% PBI in DMAA | No Change | Darker color | Pass | Partial Pass, small area came off | 11 |
| 1F | 2.5% EPON 161 + 2.5% TETA + 95% of 9% PBI in DMAA | No Change | Darker color | Fail | Partial Pass | 11 |

Example 2

In Example 2, several mixtures (2C-2H) of polyazoles, epoxies, initiators, and solvents at various weight ratios are screened for: Stability (a visual observation of changes in the mixture after standing at room temperature overnight); Appearance (a visual observation of the mixture's appearance after standing at room temperature overnight); Cross-hatch adhesion (ASTM D3359, as discussed in Example 1); and Pull-tape adhesion (ASTM D3359, as discussed in Example 1). Mixtures 2A and 2B are polyazoles in solvent. The results are reported in TABLE 2. Samples were coated onto glass substrates and cured at: 150° C. for 30 minutes; then 280° C. for 30 minutes, and then 380° C. for 30 minutes.

TABLE 2

| Sample | Description | Stability | Appearance | Cross-hatch | Tape-Pull |
|---|---|---|---|---|---|
| 2A | 9% PBI in DMAC | No change | Light Brown, good | Fail | Fail |
| 2B | 9% PBI in DMAA | No change | Light brown, good | Pass | Fail |
| 2C | 2.5% ADEKA EP 4088S + 2.5% TETA + 95% of 9% PBI in DMAA | No change | Slightly darker, good | Pass | Pass (good) |
| 2D | 2.5% of 50% DEN 439 in DMAA + 2.5% TETA + 95% of 9% PBI in DMAA | No change | Dark, good | Pass | Pass (small area came off) |
| 2E | 2.5% EPON 161 + 2.5% TETA + 95% of 9% PBI in DMAA | No change | Dark, good | Pass | Pass |
| 2F | 71.25% of 15% PBI in DMAA + 23.75% of REZICURE 3056 in DMAA + 5% of 10% AIBN in Dioxolane | No change | Dark, small bubbles, air pockets | Pass | Pass (small area came off) |
| 2G | 2.5% EBECRYL3605 + 2.5% TETA + 95% of 9% PBI in DMAA | No change | Dark, small bubbles on top | Pass | Fail (some resistance) |
| 2H | 2.5% CARDOLITE 514 + 2.5% TETA + +95% of 9% PBI in DMAC | No change | Dark brown, good | Pass | Fail (some resistance) |

Example 3

In Example 3, the efficacy of certain Lithium compounds affect on the polyazole solution's stability is reported. The results are reported in TABLE 3. In this example the reported samples were prepared, then let stand at room temperature, and observations were reported.

TABLE 3

| Sample | Description | Stability Observation |
|---|---|---|
| 3A | 25% PBI in DMAA without 2% LiNO₃ | Gels formed in 1-2 days |
| 3B | 25% PBI in DMAA with 2% LiNO₃ | Stable after 1 week (observation then terminated) |
| 3C | 25% PBI in DMAC without 2% LiNO₃ | Stable after 1 week (observation then terminated) |
| 3D | 25% PBI in DMAC with 2% LiNO₃ | Stable after 1 week (observation then terminated) |

Example 4

In Example 4, several mixtures of polyazoles, epoxies, and initiators at various weight ratios are screened for: Stability (a visual observation of changes in the mixture after standing at room temperature overnight); Appearance of the coating after cure to 380 C (a visual observation of the coating's appearance after cure; Cross-hatch adhesion (ASTM D3359, as discussed in Example 1); Pull-tape adhesion (ASTM D3359, as discussed in Example 1); Thickness, micron or μm, (measured, if sample passes cross-hatch test, with a micrometer, sample measurements are averaged). The results are reported in TABLE 4. All solutions were stable and the components were compatible. Samples were coated onto glass substrates and cured at: 150° C. for 30 minutes; then 280° C. for 30 minutes, and then 380° C. for 30 minutes.

TABLE 4

| Sample | Description | Stability | Appearance | Cross-hatch | Tape-Pull | Thickness |
|---|---|---|---|---|---|---|
| 4A | 9% PBI in DMAA | No change | Brown, glossy, good | Pass | Fail | Did not test |
| 4B | 1% EPON 161 + 2.5% TETA + 96.5% of 9% PBI in DMAA | No change | Lightly darker brown, glossy, good | Pass | Fail, samll area lifted off | Did not test |
| 4C | 2.5% EPON 161 + 2.5% TETA + 95% of 9% PBI in DMAA | No change | Lightly darker brown, glossy, good | Pass | Pass | 15 |
| 4D | 1% EPON 160 + 2.5% TETA + 96.5% of 9% PBI in DMAA | No change | Lightly darker brown, glossy, good | Pass | Pass | 7 |
| 4E | 2.5% EPON 160 + 2.5% TETA + 95% of 9% PBI in DMAA | No change | Lightly darker brown, glossy, good | Pass | Pass | 10 |
| 4F | 1% EPON 154 + 2.5% TETA + 96.5% of 9% PBI in DMAA | No change | Lightly darker brown, glossy, good | Pass | Partial Pass, Very small area lifted off with resistance | Did not test |
| 4G | 2.5% EPON 161 + 2.5% TETA + 95% of 9% PBI in DMAA | No change | Lightly darker brown, glossy, good | Pass | Pass | 6 |

Example 5

In Example 5, a primer is investigated to improve the adhesion of the coating to a metal (i.e., steel) substrate. The substrates were cleansed with a 5% TSP (trisodium phosphate) aqueous solution at 70-80° C. for 15 minutes, then rinsed 3 times with DI (deionized) water, and then air dried. The mixtures (and primers) were cured on the substrate as follows: 100° C. for 10 minutes, 250° C. for 10 minutes, and then 380° C. for 70 minutes. Adhesion of cured samples was determined by the cross-hatch test (ASTM D3359, as discussed in Example 1) and the tape-pull test (ASTM D3359, as discussed in Example 1). The results are reported in TABLES 5A and 5B.

TABLE 5A

| Sample | Description | Stabilizer | Primer | Cross-hatch | Tape-pull |
|---|---|---|---|---|---|
| 5A-1 | 5% EPON 160 + 4% MXDA + 91% of 9% PBI in DMAC | None | None | Pass | Fail |
| 5B-1 | 5% EPON 160 + 4% MXDA + 91% of 9% PBI in DMAC | 0.5% LiNO$_3$ | None | Pass | Fail |
| 5C-1 | 9% PBI in DMAC | 1.5% LiCl | None | Pass | Fail |
| 5D-1 | 9% PBI in DMAA | 1.5% LiCl | None | Pass | Fail |
| 5F-1 | 9% PBI in DMAA | 1.5% LiCl | None | Pass | Pass |
| 5G-1 | 5% EPON 160 + 4% MXDA + 91% of 9% PBI in DMAC | None | 3% Epon 160 in DMAA | Pass | Fail |
| 5H-1 | 5% EPON 160 + 4% MXDA + 91% of 9% PBI in DMAC | 0.5% LiNO$_3$ | 3% Epon 160 in DMAA | Pass | Fail |
| 5I-1 | 9% PBI in DMAC | 1.5% LiCl | 3% Epon 160 in DMAA | Pass | Fail |
| 5J-1 | 9% PBI in DMAA | 1.5% LiCl | 3% Epon 160 in DMAA | Pass | Fail |
| 5K-1 | 9% PBI in DMAA | 1.5% LiCl | 3% Epon 160 in DMAA | Pass | Fail |

TABLE 5B

| Sample | Description | Stabilizer | Primer | Cross-hatch | Tape-pull |
|---|---|---|---|---|---|
| 5A-2 | 5% EPON 160 + 4% MXDA + 91% of 9% PBI in DMAC | None | None | Pass | Pass |
| 5B-2 | 5% EPON 160 + 4% MXDA + 91% of 9% PBI in DMAC | 0.5% LiNO$_3$ | None | Pass | Pass |
| 5C-2 | 9% PBI in DMAC | 1.5% LiCl | None | Pass | Fail |
| 5D-2 | 9% PBI in DMAA | 1.5% LiCl | None | Pass | Partial pass |
| 5F-2 | 9% PBI in DMAA | 1.5% LiCl | None | Pass | Fail |
| 5G-2 | 5% EPON 160 + 4% MXDA + 91% of 9% PBI in DMAC | None | 3% Epon 160 in DMAA | Pass | Fail |
| 5H-2 | 5% EPON 160 + 4% MXDA + 91% of 9% PBI in DMAC | 0.5% LiNO$_3$ | 3% Epon 160 in DMAA | Pass | Pass |
| 5I-2 | 9% PBI in DMAC | 1.5% LiCl | 3% Epon 160 in DMAA | Pass | Fail |
| 5J-2 | 9% PBI in DMAA | 1.5% LiCl | 3% Epon 160 in DMAA | Pass | Fail |
| 5K-2 | 9% PBI in DMAA | 1.5% LiCl | 3% Epon 160 in DMAA | Pass | Pass |

Example 6

In Example 6, a different primer is investigated with various coating formulation (one formulation including an adhesion promoting additive (boric oxide) on a metal (i.e., steel) substrate. The substrates were cleansed with a 5% TSP (trisodium phosphate) aqueous solution at 70-80° C. for 15 minutes, then rinsed 3 times with DI (deionized) water, and then paper towel dried. The primers were cured as follows: 100° C. for 30 minutes, 150° C. for 30 minutes, and then 200° C. for 30 minutes. The coatings were cured as follows: 100° C. for 10 minutes, 250° C. for 10 minutes, and then 380° C. for 70 minutes. Adhesion of cured samples was determined by the cross-hatch test (ASTM D3359, as discussed in Example 1) and the tape-pull test (ASTM D3359, as discussed in Example 1). The results are reported in TABLE 6.

TABLE 6

| Sample | Description | Stabilizer | Primer | Cross-hatch | Tape-pull |
|---|---|---|---|---|---|
| 6A | 9% PBI in DMAC | 1.5% LiCl | 9% PBI in DMAA | Pass | Fail |
| 6B | 9% PBI in DMAA | 1.5% LiCl | 9% PBI in DMAA | Pass | Fail |
| 6C | 9% PBI in DMAA | None | 9% PBI in DMAA | Pass | Fail |
| 6D | 5% EPON 160 + 4% MXDA + 91% of 9% PBI in DMAA | None | 9% PBI in DMAA | Pass | Fail |
| 6E | 5% EPON 160 + 4% MXDA + 91% of 9% PBI in DMAA | 0.5% LiNO$_3$ | 9% PBI in DMAA | Pass | Fail |
| 6F | 5% EPON 160 + 4% of 9.1% Boric Oxide in MDEA + 82% of 9% PBI in DMAA | None | 9% PBI in DMAA | Pass | Fail |
| 6G | 9% PBI in DMAA | None | 9% PBI in DMAA | Pass | Fail |
| 6H | 5% EPON 160 + 4% MXDA + 91% of 9% PBI in DMAA | None | 9% PBI in DMAA | Pass | Fail |

The present invention may be embodied in other forms without departing from the spirit and the essential attributes thereof, and, accordingly, reference should be made to the appended claims, rather than to the foregoing specification, as indicating the scope of the invention.

We claim:
1. A coating comprising a mixture of polybenzimidazole polymer and an epoxy, said mixture has a weight ratio of epoxy:polybenzimidazole polymer in a range of 1:2-199; wherein said epoxy is a reaction product of an epoxy resin and an initiator; and said mixture is free of any lubricants.
2. The coating of claim 1 wherein the weight ratio of epoxy:polybenzimidazole polymer is in the range of 1:2-15.
3. The coating of claim 1 wherein the weight ratio of epoxy:polybenzimidazole polymer is in the range of 1:2-6.
4. A coating system comprising the coating of claim 1 and a primer, the primer underlying the coating.

5. The coating of claim 4 wherein the primer comprises: a polybenzimidazole polymer, an epoxy resin or a mixture of polybenzimidazole polymer and epoxy resin.

6. The coating of claim 5 wherein the epoxy resin of the primer and the epoxy resin reactant of the epoxy in the coating are like resins.

7. The coating of claim 1 wherein the mixture further comprises an adhesion promoter.

8. The coating of claim 7 wherein the adhesion promoter is boric oxide.

9. The coating of claim 7 wherein the mixture has a weight ratio of epoxy:polybenzimidazole polymer:adhesion promoter in the range of 1:1-15:0.01-1.5.

10. The coating of claim 1 wherein the polybenzimidazole polymer is selected from the group consisting of: poly-2,2'-(m-phenylene)-5,5'-bibenzimidazole, poly-2,2'-(pyridylene-3",5")-5,5'-bibenzimidazole, poly-2,2'-(furylene-2",5")-5,5'-bibenzimidazole, poly-2,2'-(naphthalene-1",6")-5,5'-bibenzimidazole, poly-2,2'-(biphenylene-4",4")-5,5'-bibenzimidazole, poly-2,2'-amylene-5,5'-bibenzimidazole, poly-2,2'-octamethylene-5,5'-bibenzimidazole, poly-2,6-(m-phenylene)-diimidazobenzene, poly-2,2'-cyclohexenyl-5,5'-bibenzimidazole, poly-2,2'-(m-phenylene)-5,5'-di(benzimidazole)ether, poly-2,2'-(m-phenylene)-5,5'-di(benzimidazole)sulfide, poly-2,2'-(m-phenylene)-5,5'-di(benzimidazole)sulfone, poly-2,2'-(m-phenylene)-5,5'-di(benzimidazole)methane, poly-2',2"-(m-phenylene)-5',5"-di(benzimidazole)propane-2,2, and poly-2,2'-(m-phenylene)-5',5"-di(benzimidazole)ethylene-1,2, and mixtures thereof.

11. The coating of claim 10 wherein the polybenzimidazole polymer is poly-2,2'-(m-phenylene)-5,5'-bibenzimidazole.

12. The coating of claim 10 wherein the polybenzimidazole polymer has an IV>0.4 dL/g.

13. The coating of claim 1 wherein the epoxy resin is selected from the group consisting of: glycidyl ethers, glycidyl esters, glycidyl amines, linear aliphatics, cycloaliphatics, and combinations thereof.

14. The coating of claim 1 wherein the initiator is an amine, an acid anhydride or a combination of an amine and an acid anhydride.

15. A solution comprising a polybenzimidazole polymer, an epoxy resin, an initiator, and a carrier solvent.

16. The solution of claim 15 wherein the polybenzimidazole polymer is selected from the group consisting of: poly-2,2'-(m-phenylene)-5,5'-bibenzimidazole, poly-2,2'-(pyridylene-3",5")-5,5'-bibenzimidazole, poly-2,2'-(furylene-2",5")-5,5'-bibenzimidazole, poly-2,2'-(naphthalene-1",6")-5,5'-bibenzimidazole, poly-2,2'-(biphenylene-4",4")-5,5'-bibenzimidazole, poly-2,2'-amylene-5,5'-bibenzimidazole, poly-2,2'-octamethylene-5,5'-bibenzimidazole, poly-2,6-(m-phenylene)-diimidazobenzene, poly-2,2'-cyclohexenyl-5,5'-bibenzimidazole, poly-2,2'-(m-phenylene)-5,5'-di(benzimidazole)ether, poly-2,2'-(m-phenylene)-5,5'-di(benzimidazole)sulfide, poly-2,2'-(m-phenylene)-5,5'-di(benzimidazole)sulfone, poly-2,2'-(m-phenylene)-5,5'-di(benzimidazole)methane, poly-2',2"-(m-phenylene)-5',5"-di(benzimidazole)propane-2,2, and poly-2,2'-(m-phenylene)-5',5"-di(benzimidazole)ethylene-1,2, and mixtures thereof.

17. The solution of claim 16 wherein the polybenzimidazole polymer is poly-2,2'-(m-phenylene)-5,5'-bibenzimidazole.

18. The solution of claim 15 wherein the polybenzimidazole polymer has an IV>0.4 dL/g.

19. The solution of claim 15 wherein the epoxy resin is selected from the group consisting of: glycidyl ethers, glycidyl esters, glycidyl amines, linear aliphatics, cycloaliphatics, and combinations thereof.

20. The solution of claim 15 wherein the initiator is an amine, an acid anhydride or a combination of an amine and an acid anhydride.

21. The solution of claim 15 further comprising a stabilizer.

22. The solution of claim 21 wherein the stabilizer is a lithium compound.

23. The solution of claim 22 wherein the lithium compound is selected from the group consisting of lithium chloride, lithium nitrate, and combinations thereof.

24. The solution of claim 21 wherein the stabilizer is provided in an amount of from 0.1-5.0 weight % of the solution.

25. The solution of claim 24 wherein the stabilizer is provided in an amount of from 0.5-2.0 weight % of the solution.

26. The solution of claim 15 further comprising an adhesion promoter.

27. The solution of claim 26 wherein the adhesion promoter is boric oxide.

28. The solution of claim 26 wherein the solution has a weight ratio of epoxy resin and initiator:polybenzimidazole polymer:adhesion promoter in the range of 1:1-15:0.01-1.5.

29. The solution of claim 15 wherein the solution has a weight ratio of epoxy resin:initiator in the range of 1-10:10-1.

30. The solution of claim 15 wherein the solution has a weight ratio of epoxy resin:initiator in the range of 1-3:3-1.

31. The solution of claim 15 wherein the solution has a weight ratio of epoxy resin and initiator:polybenzimidazole polymer in the range of 1-199:199-1.

32. The solution of claim 15 wherein the solution has a weight ratio of epoxy resin and initiator:polybenzimidazole polymer in the range of 1:1-15.

33. The solution of claim 15 wherein the solution has a weight ratio of epoxy resin and initiator:polybenzimidazole polymer in the range of 2-10:3-15.

* * * * *